(12) United States Patent
Van Belleghem et al.

(10) Patent No.: US 9,743,804 B2
(45) Date of Patent: Aug. 29, 2017

(54) DEVICE FOR PREPARING INFUSED DRINKS, COMPRISING AN INJECTION TUBE LEADING INTO THE INFUSION CHAMBER

(71) Applicant: TCONCEPT COMPANY S.P.R.L., Corroy-le-Grand (BE)

(72) Inventors: Luc Van Belleghem, Corroy-le-Grand (BE); Yohann Beaufils, Hérouville St Clair (FR)

(73) Assignee: TCONCEPT COMPANY S.P.R.L, Corry-le-Grand (BE)

( * ) Notice: Subject to any disclaimer, the term of this patent is extended or adjusted under 35 U.S.C. 154(b) by 0 days.

(21) Appl. No.: 14/901,257

(22) PCT Filed: Jun. 24, 2014

(86) PCT No.: PCT/EP2014/063299
§ 371 (c)(1),
(2) Date: Dec. 28, 2015

(87) PCT Pub. No.: WO2014/206991
PCT Pub. Date: Dec. 31, 2014

(65) Prior Publication Data
US 2016/0324362 A1 Nov. 10, 2016

(30) Foreign Application Priority Data
Jun. 25, 2013 (BE) .................................. 2013/0437

(51) Int. Cl.
A47J 31/40 (2006.01)
B65D 85/804 (2006.01)
A47J 31/36 (2006.01)
A47J 31/60 (2006.01)

(52) U.S. Cl.
CPC ........... *A47J 31/407* (2013.01); *A47J 31/369* (2013.01); *A47J 31/3633* (2013.01); *A47J 31/60* (2013.01); *B65D 85/8043* (2013.01)

(58) Field of Classification Search
CPC .... A47J 31/407; A47J 31/3633; A47J 31/369; A47J 31/60; B65D 85/8043
See application file for complete search history.

(56) References Cited

FOREIGN PATENT DOCUMENTS

EP 2112093 10/2009
EP 2159167 3/2010

*Primary Examiner* — Erik Kashnikow
*Assistant Examiner* — Chaim Smith
(74) *Attorney, Agent, or Firm* — Duane Morris LLP; J. Rodman Steele, Jr.; Gregory M. Lefkowitz

(57) ABSTRACT

The invention relates to a device comprising: a support arranged to receive a capsule containing material to be infused, provided with a front face comprising a filter wall, a ring, a rear face and a solid casing; injection means arranged to introduce an infusion liquid into the capsule; an infusion chamber having a substantially vertical opening arranged to be in fluid communication with the filter wall, said ring comprising sealing means arranged to maintain the fluid communication sealed from the surrounding medium; and an outlet provided with closing/opening means.

20 Claims, 2 Drawing Sheets

DEVICE FOR PREPARING INFUSED DRINKS, COMPRISING AN INJECTION TUBE LEADING INTO THE INFUSION CHAMBER

CROSS-REFERENCE TO RELATED APPLICATIONS

This application is a §371 national stage entry of International Application No. PCT/EP2014/063299, filed Jun. 24, 2014, which claims priority to Belgian Patent Application No. 2013/0437 filed Jun. 25, 2013, the entire contents of which are incorporated herein by reference.

This invention relates to a device for preparing infused drinks comprising:
- a support arranged to receive a capsule containing material to be infused in dry state provided with a front face comprising a filter wall, a ring surrounding said front face, a rear face, opposite said front face and a solid casing extending between said ring and said rear face and defining a container arranged to contain said material to be infused, in a position in which said front face is substantially vertical,
- injection means arranged to introduce an infusion liquid into said capsule, when said support receives a capsule,
- an infusion chamber having a substantially vertical opening, said substantially vertical opening being arranged to be in fluid communication with said filter wall, said ring comprising sealing means arranged to maintain the fluid communication sealed with respect to a surrounding medium, outside a fluid exchange zone, and
- an outlet provided with closing/opening means arranged to allow an infused liquid to flow from the infusion chamber.

Such a device is known for example from document EP2112093. However, according to this document the injection of water is carried out through the rear face of the capsule, thus requiring carrying out a piercing of the latter.

Unfortunately, a rear piercing of the capsule requires on the one hand a practically perfect horizontal alignment of the tip used to pierce the rear face and on the other hand to manufacture a capsule with a rupture zone. Then, the manufacture of such a device is complex as it requires precision mechanics in order to obtain a tip that is perfectly perpendicular to the rear face to be ruptured that the use of the device over time places in peril. In addition, the capsule often remains impaled on the tip and therefore cannot easily be removed without human intervention, which itself sometimes requires removing a portion of the device or making the zone in which the capsule is located easily accessible. In any case, using the tip to pierce the rear face of the capsule has certain disadvantages in terms of the design of the machine, in terms of the capsule and in terms of food as the tip is not cleaned or changed after use.

The invention has for purpose to overcome the disadvantages of prior art by procuring an invention that makes it possible to simplify the design of the machine and to solve the problems of blocked and/or impaled capsules on said tip.

In order to solve this problems, according to the invention, a device such as indicated in the beginning is provided characterised in that it further comprises an injection tube of said infusion liquid connected to an upper portion of said infusion chamber in the vicinity of said substantially vertical opening.

In this way, the infusion liquid penetrates by means of the injection tube into said infusion chamber via the top of the infusion chamber and flows in such a way as to progressively fill the unit constituted of the infusion chamber in fluidic communication with said container defined by said solid casing extending between said ring and said rear face, in which the material to be infused is located. The container of the capsule is also filled progressively at the same speed as the infusion chamber.

In an alternative, the infusion liquid that supplies the infusion chamber as such flows from the top to the bottom creating turbulences in a portion of the infusion liquid already present as such forming turbulences in the infusion liquid contained in the infusion chamber making it possible to improve the homogeneity of the infusion liquid which becomes over time the infused liquid and a brewing of this infusion liquid. In addition, this injection of injection liquid via the infusion chamber makes it possible to obtain a difference in temperature of the infusion liquid present in the infusion chamber and that present in the container of the capsule between 3 and 10° C. and typically of about 5° C. This makes it possible to reach an optimal temperature for the infusion in the container of the capsule, while still retaining the infusion liquid in the infusion chamber at a slightly higher temperature, which as such makes it possible to serve an infused drink that is still sufficiently hot after the duration of the infusion. Note that during the entire injection phase of the infusion liquid, the newly-injected infusion liquid heats the infusion liquid already present.

In another alternative, said injection tube is extended by an elbow arranged to inject said infusion liquid through said front face of said capsule. In this way, the infusion liquid first supplies the container of the capsule and then the infusion chamber. The infusion liquid as such flows from the top to the bottom creating turbulences in a portion of the infusion liquid already present in the container of the capsule as such forming turbulences in the infusion liquid making it possible to improve the homogeneity of the infusion liquid which becomes over time the infused liquid and a brewing of this infusion liquid. In addition, this injection of injection liquid into the container of the capsule makes it possible to obtain a difference in temperature of the infusion liquid present in the container of the capsule and that present in the infusion chamber between 3 and 10° C. and typically of about 5° C. This makes it possible to reach an optimal temperature for the infusion in the container of the capsule, while still retaining the infusion liquid in the infusion chamber at a slightly lower temperature, which as such makes it possible to serve an infused drink that is still sufficiently hot after the duration of the infusion. Note that during the entire injection phase of the infusion liquid, the newly-injected infusion liquid heats the infusion liquid already present.

Advantageously, the infusion chamber of the device according to this invention is at least partially formed from a material with a polyfluoride base, such as for example PTFE, FEP, or PFA.

In a particular embodiment, said capsule support is a seat that has a significantly open structure.

Preferably, the device according to this invention further comprises means for cleaning arranged to introduce a rinsing liquid into said infusion chamber.

In a particularly preferred embodiment of this invention, the device comprises a means for heating said infusion liquid.

Advantageously, the device according to this invention, further comprising, furthermore a reservoir of infusion liquid, connected or comprising said means of heating said infusion liquid.

In an advantageous embodiment, the device according to this invention further comprises a pump connected on the one hand to said injection tube of infusion liquid and to a supply of infusion liquid, possibly in the form of said reservoir of infusion liquid.

The device according to the invention further comprises, preferably, a pump connected on the one hand to said injection tube of infusion liquid and to a supply of infusion liquid, connected to said device for heating said infusion liquid.

In an alternative according to the invention, the device further comprises a pressure regulator device, connected to said injection tube of infusion liquid and to a supply of infusion liquid, possibly upstream or downstream of said pump, when it is present.

In a particularly preferred embodiment, wherein said injection tube of infusion liquid has a straight zone, of which one end is connected to said infusion chamber, said straight zone being substantially vertical.

In yet another particularly preferred embodiment, said straight zone of said injection tube of infusion liquid is at least partially formed from a material with a polyfluoride base, such as for example PTFE, FEP, or PFA.

Preferably, said straight zone of said injection tube of infusion liquid is integral with said infusion chamber and is for example obtained by simultaneous moulding of said infusion chamber and of said straight zone.

In an entirely advantageous and preferred manner, wherein said infusion chamber comprises a top through which passes a first horizontal tangent head plane and a median plane separating the infusion chamber into two portions of which a first portion comprises said substantially vertical opening, said substantially vertical opening also having a top through which passes a second horizontal tangent plane, parallel to said first horizontal tangent head plane, said injection tube of said infusion liquid being connected to said infusion chamber through an orifice for the passing of infusion liquid passing through an outer wall of said infusion chamber, said orifice for the passing of infusion liquid being located between the first and the second tangent planes and in said first portion.

Other embodiments of the device according to the invention are indicated in the annexed claims.

The invention also has for object a method for preparing infused drinks, comprising the steps of:
  introducing a capsule containing material to be infused in dry state provided with a front face comprising a filter wall, a ring surrounding said front face, a rear face, opposite said front face and a solid casing extending between said ring and said rear face and defining a container arranged to contain said material to be infused, in a position in which said front face is substantially vertical, on a capsule support,
  injecting an infusion liquid into said container of said capsule,
  an infusing of said infusion liquid with said dry matter to be infused in such a way as to form said infused drink in said infusion chamber in fluidic communication with the container of the capsule, and
  removing said infused liquid via an opening located in the bottom of said infusion chamber after said step of infusion.

This method is characterised in that said injecting of an infusion liquid into said container of said capsule takes place by injection of said infusion liquid into a unit constituted of the infusion chamber in fluidic communication with said container of said capsule, said infusion liquid percolating through said filter wall in order to penetrate into said container of the capsule and into said infusion chamber.

Advantageously, said infusion liquid penetrates through the filter wall into the capsule and then percolates in the other direction towards the infusion chamber.

In an advantageous embodiment of the method according to this invention, a portion of the step of infusion takes place simultaneously with said injection step.

Advantageously, said injection of said infusion liquid is carried out from top to bottom and causes turbulences in the infusion liquid already present in the unit constituted of the infusion chamber and of the capsule, in such a way as to homogenise the content of the infusion liquid.

Preferably, the method according to this invention comprises a step of cleaning in which a rinsing fluid is introduced and removed from the infusion chamber.

Advantageously, the method also comprises a step of removing the capsule from its support after removing said infused liquid from the infusion chamber.

Other embodiments of the method according to the invention are indicated in the annexed claims.

Other characteristics, details and advantages of the invention shall appear in the description provided hereinafter, in a non-limiting manner and in reference to the annexed drawings.

In the figures, identical or similar elements bear the same references.

Figure 1:
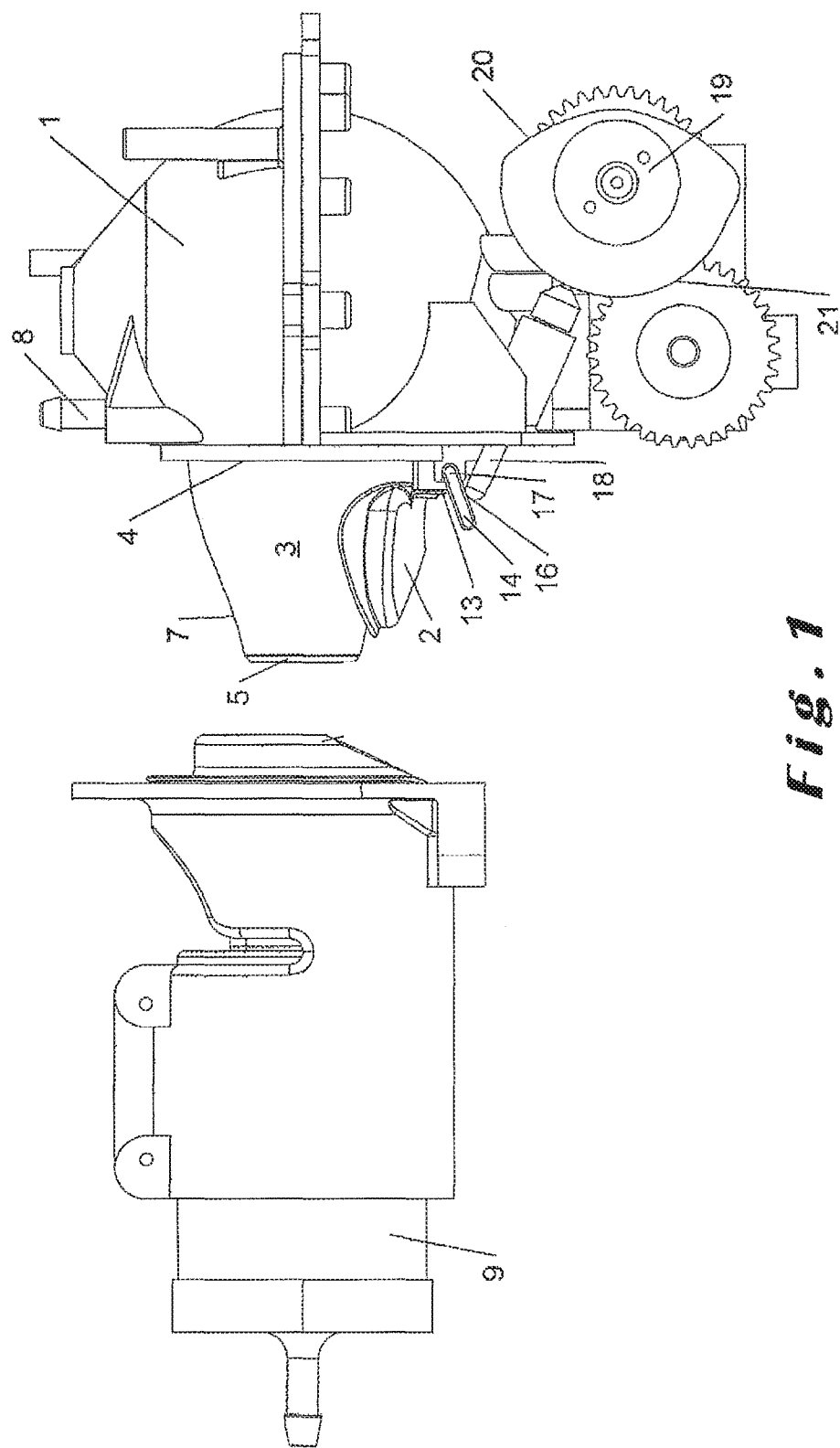
FIG. 1 is a diagrammatical view of a device according to the invention.

As can be seen in FIG. 1, the device for preparing infused drinks comprises a support (2) arranged to receive a capsule (3) containing material to be infused in dry state provided with a front face (4) comprising a filter wall, a ring (not shown) surrounding said front face (4), a rear face (5), opposite said front face (4) and a solid casing (7) extending between said ring and said rear face (4) and defining a container arranged to contain said material to be infused, in a position in which said front face (4) is substantially vertical. This support (2) takes the form of a seat having a significantly open structure and pivoting on an axis.

The device also comprises injection means arranged to introduce an infusion liquid into said capsule when said support (2) receives a capsule (3), and an infusion chamber (1) having a substantially vertical opening (8), said substantially vertical opening (8) being arranged to be in fluid communication with said filter wall, said ring comprising sealing means arranged to maintain the fluid communication sealed with respect to a surrounding medium, outside a fluid exchange zone.

The device according to the invention also comprises an outlet provided with closing/opening means arranged to allow an infused liquid to flow from the infusion chamber.

The injection tube of said infusion liquid connected to an upper portion of said infusion chamber in the vicinity of said substantially vertical opening (8).

The injection tube of infusion liquid has a straight zone, of which one end is connected to said infusion chamber (1), said straight zone being substantially vertical. The straight zone of said injection tube of infusion liquid is at least partially formed from a material with a polyfluoride base, such as for example PTFE, FEP, or PFA.

In addition, the straight zone of said injection tube of infusion liquid is integral with said infusion chamber (1) and is, for example obtained by simultaneous moulding of said infusion chamber (1) and of said straight zone.

As can be seen in FIG. 1, the infusion chamber (1) comprises a top through which passes a first horizontal tangent head plane and a median plane separating the infusion chamber (1) into two portions of which a first portion comprises said substantially vertical opening (8), said substantially vertical opening (8) also having a top through which passes a second horizontal tangent plane, parallel to said first horizontal tangent head plane, said injection tube of said infusion liquid being connected to said infusion chamber (1) through an orifice for the passing of infusion liquid passing through an outer wall of said infusion chamber (1), said orifice for the passing of infusion liquid being located between the first and the second tangent planes and in said first portion.

Figure 2:
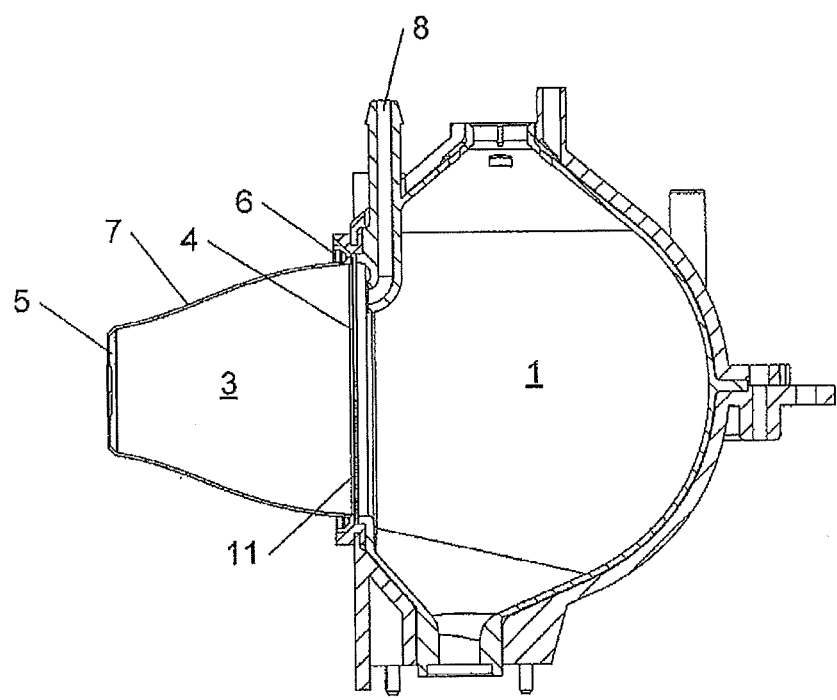
FIG. 2 is a diagrammatical view of an infusion chamber and of a capsule according to this invention.

FIG. 2 shows an infusion chamber (1) and a capsule (3) according to the invention. The capsule (3) is provided to contain a material to be infused in dry state and is provided with a front face (4) comprising a filter wall (11), a ring (6) which surrounds the front face (4), a rear face (5), opposite said front face (4) and defining a container arranged to contain said material to be infused, in a position in which said front face (4) is substantially vertical.

An advantageous aspect of this invention relates to a device intended to receive a capsule (3) of ingredients and to extract the ingredient by injecting a liquid within a capsule (3) and in and via an infusion chamber (1).

The capsule (3) is positioned between two portions. The two portions are arranged in such a way as to be mobile in relation to one another, from an open position—for the inserting or removing of a capsule (3)—to a closed position—in order to cause a heated liquid to pass within the capsule (3).

At least one of the mobile portions is actuated hydraulically and can be displaced in the closed position by the device for injecting liquid.

For this purpose, the device comprises a cylinder (9) comprising a first end and a second end, said first end comprising at least one contact zone arranged to push said rear face of the capsule and means of translation arranged to create a relative horizontal movement of translation between said cylinder (9) and said infusion chamber (9) in such a way as to maintain the seal between the capsule (3) and said infusion chamber (1) via a compression force exerted on said means of sealing maintaining the fluid communication, said means of translation are connected to said cylinder (9), said cylinder (9) having a first retracted position and a second contact position, said means of translation being arranged to displace said cylinder (9) between said first position and said second position, corresponding to a position in which said capsule (3) is in sealed contact with said infusion chamber (1) and in which said compression force is exerted on said means of sealing.

A simple means of translation using the energy present or human energy is provided, without an additional device such as a low-voltage motor makes it possible to carry out a relative translation between the infusion chamber (1) and a cylinder (9) maintaining the seal between the capsule (3) and the infusion chamber (1) in order to ensure a sealed fluid communication between the two.

As a general rule, this device is comprised of a machine for preparing drinks for receiving capsules (3) of ingredients. For example, the machine is a machine for preparing coffee, tea, chocolate or soup. In particular, the apparatus is arranged for the preparing inside an infusion chamber (1) by the passage of hot water or of another liquid within a capsule (3) containing an ingredient of the drink to be prepared, such as ground coffee or tea or chocolate or cocoa or milk powder.

The device of this invention will enclose a capsule (3) comprising materials to be infused each requiring different infusion temperatures. For example, certain teas will infuse between 60 and 95° C.

The purpose of this invention is to allow the various materials to be infused enclosed within the capsule (3) a filter wall to be in contact with a liquid at a temperature that is as close as possible to that required by the material to infuse.

The device also comprises an infusion chamber (1), placed in connection and sealed with the capsule (3). The latter will be of a capacity that makes it possible to serve at least one cup. The process of injecting the liquid will therefore allow for the filling of the infusion chamber (1). This process will generate a loss of temperature of the liquid injected in contact with the material of the infusion chamber (1).

This invention advantageously makes it possible to maintain within the capsule (3) the temperature of the liquid injected at a temperature as close as possible to that required by injecting the liquid within the capsule (3). The filter wall will create an inertia of dispersion of the temperature in favour of the liquid maintained in the capsule (3).

This invention also makes it possible thanks to this process of injecting liquid to be able to guarantee a homogeneity of the infusion. Indeed, the injunction of liquid during the infusion will brew the liquid contained in the capsule (3) with that contained in the infusion chamber and will also make it possible to stir the material to be infused contained in the capsule (3).

This invention will also advantageously prevent a problem that is frequently encountered in many devices for preparing hot drinks that use capsules (3) or other rigid or semi-rigid casings and which, through a device pierce the casing in order to inject the liquid through this piercing tool. The introduction of this tool and the extraction of it require substantial forces. The ejection of the capsule can be rendered more complex by the extraction of this tool.

For this purpose, said support (2) is in the form of a seat comprising a basic structure with a shape complementary to the shape of said casing. The seat is substantially open at the top in order to allow for the reception of said capsule (3) during a descent of the latter and comprises a protrusion (13) provided with a fastening zone (15) and a segment integral with said fastening zone (15) and forming an angle between 25 and 80 degrees with a median horizontal plane of said seat (2) as well as a junction, between said fastening zone (15) and the segments, provided with an orifice through which passes a pivot axis, substantially transversal to said protrusion. Said fastening zone (15) connecting the seat (2) to said junction (17) while the segment (14) is extended from said junction (17) at a free end, and comprising a bearing zone for the follower piston (18).

The follower piston (18) is set into motion by a cam (19), for example integral with a gear actuated by a servo-motor or by a cam shaft coupled to a valve. The cam (19) comprises at least one first profile portion (21) and a second profile portion (20), with each profile portion setting into motion said follower piston.

The first profile portion (21) corresponds to a position of the follower piston such that the piston exerts a pressure on said bearing zone in such a way that the seat has a position for receiving said capsule (3) and provides for the aligning of the front face (4) of the capsule (3) with said substantially vertical opening (8) of said infusion chamber (1).

The second profile portion (20) corresponds to a position of the follower piston (18) such that the piston is released from the position of infusion to an idle position and no longer exerts any pressure on said bearing zone, making it possible to release the capsule (3) and to allow it to be removed to a container arranged to receive said capsule (3) to be removed.

Indeed, the device according to the invention makes it possible to pass the capsule (3) from a position of insertion to a position of infusion when at least one of the two mobile portions of the device position the latter in closed position, it passes it into its ejection position and when the mobile portion is open after the infusion, the capsule (3) is naturally cleared under the simple effect of gravitation. It falls into a drawer or any other means for recovering the used capsule (3) and the consumer is ready to reload the device.

In order to manage these various positions, the device comprises a pivoting seat that makes it possible to be placed in a position for receiving the capsule (3) or placed in a position that allows for the ejecting of the capsule (3) via gravity.

The device according to this invention also coordinates the positions of the seat, support (2) of the capsule (3) by taking into account the processes inherent with an comprising an infusion chamber (1).

Advantageously, this infusion chamber (1) has one or more cycles for injecting heated water, allowing for the infusion of the materials contained in the capsule (3). This phase of injecting water will require a perfect positioning and sealing of the capsule (3) with the chamber and a closed position of the flow channel of the infused liquid.

After the duration of the infusion the flow channel will be opened in the direction of the cup.

Typically this device comprises a multi-channel valve. Once the liquid has flowed, a second process begins in order to inject a liquid or a gas for rinsing into the infusion chamber (1). This process starts with the support of the capsule (3) maintained in its position of receiving and still sealed with the chamber (1). Then, the support (2) of the capsule (3) will pass into ejection position and the capsule (3) will be ejected via gravity. This phase allowing at the end of the rinsing cycle to be carried out without the presence of the capsule (3) and therefore without the risk that the infused liquid which could still be located therein flows into the infusion chamber (1).

The positions of the support dictated by the cam are therefore coupled to the positions of the multi-channel valve managing the flow of the infused liquid or of the rinsing liquid of the infusion chamber (1).

It is of course understood that this invention is in no way limited to the embodiments described hereinabove and that many modifications can be made to it without leaving the scope of the annexed claims.

The invention claimed is:

1. Device for preparing infused drinks comprising:
   a support comprising a seat arranged to receive a capsule containing a material to be infused in a dry state and provided with a front face, said front face comprising a filter wall, a ring surrounding said front face, a rear face, opposite said front face and a solid casing extending between said ring and said rear face and defining a container arranged to contain said material to be infused, in a position in which said front face is substantially vertical,
   injection means arranged to introduce an infusion liquid into said capsule, when said support receives a capsule,
   an infusion chamber having a substantially vertical opening, said substantially vertical opening being arranged to be in fluid communication with said filter wall, said ring comprising sealing means arranged to maintain the fluid communication sealed with respect to a surrounding medium, outside a fluid exchange zone, and
   an outlet provided with closing/opening means arranged to allow an infused liquid to flow from the infusion chamber, characterised in that it further comprises an injection tube of said infusion liquid connected to an upper portion of said infusion chamber in the vicinity of said substantially vertical opening.

2. Device according to claim 1, wherein said injection tube is extended by an elbow arranged to inject said infusion liquid through said front face of said capsule.

3. Device according to claim 1, wherein said infusion chamber is at least partially formed from a material with a polyfluoride base, such as for example PTFE, FEP, or PFA.

4. Device according to claim 3, wherein said capsule support has a significantly open structure.

5. Device according to claim 1, further comprising means for cleaning arranged to introduce a rinsing liquid into said infusion chamber.

6. Device according to claim 1, comprising a means of heating said infusion liquid.

7. Device according to claim 6, further comprising, furthermore a reservoir of infusion liquid, connected or comprising said means of heating said infusion liquid.

8. Device according to claim 6, further comprising a pump connected on the one hand to said injection tube of infusion liquid and to a supply of infusion liquid, connected to said device for heating said infusion liquid.

9. Device according to claim 1, further comprising a pump connected on the one hand to said injection tube of infusion liquid and to a supply of infusion liquid, possibly in the form of said reservoir of infusion liquid.

10. Device according to claim 1, further comprising a pressure regulator device, connected to said injection tube of infusion liquid and to a supply of infusion liquid, possibly upstream or downstream of said pump, when it is present.

11. Device as claimed in claim 1, wherein said injection tube of infusion liquid has a straight zone, of which one end is connected to said infusion chamber, said straight zone being substantially vertical.

12. Device according to claim 11, wherein said straight zone of said injection tube of infusion liquid is at least partially formed from a material with a polyfluoride base, such as for example PTFE, FEP, or PFA.

13. Device according to claim 12, wherein said straight zone of said injection tube of infusion liquid is integral with said infusion chamber and is for example obtained by simultaneous moulding of said infusion chamber and of said straight zone.

14. Device as claimed in claim 1, wherein said infusion chamber comprises a top through which passes a first horizontal tangent head plane and a median plane separating the infusion chamber into two portions of which a first portion comprises said substantially vertical opening, said substantially vertical opening also having a top through which passes a second horizontal tangent plane, parallel to said first horizontal tangent head plane, said injection tube of said infusion liquid being connected to said infusion chamber through an orifice for the passing of infusion liquid passing through an outer wall of said infusion chamber, said orifice for the passing of infusion liquid being located between the first and the second tangent planes and in said first portion.

15. Method for preparing infused drinks with the device of claim 1, comprising the steps of:

introducing a capsule containing a material to be infused in a dry state said capsule provided with a front face (4) comprising a filter wall, a ring surrounding said front face, a rear face, opposite said front face and a solid casing extending between said ring and said rear face and defining a container arranged to contain said material to be infused, in a position in which said front face is substantially vertical, on a capsule support, injecting an infusion liquid into said container of said capsule, so as to form said infused drink in said infusion chamber in fluidic communication with the container of the capsule, and a removing of said infused liquid via an opening located in the bottom of said infusion chamber after said step of infusion, characterised in that said injecting an infusion liquid into said container of said capsule takes place by injection of said infusion liquid into a unit constituted of the infusion chamber in fluidic communication with said container of said capsule, said infusion liquid percolating through said filter wall in order to penetrate into said container of the capsule and into said infusion chamber.

16. Method according to claim 15, wherein said infusion liquid penetrates through the filter wall into the capsule and then percolates in the other direction towards the infusion chamber.

17. Method according to claim 16, wherein a portion of the step of infusion takes place simultaneously with said step of injection.

18. Method according to claim 16, wherein said injection of said infusion liquid is carried out from top to bottom and causes turbulences in the infusion liquid already present in the infusion chamber and/or in the container of the capsule, in such a way as to homogenise the content of the infusion liquid.

19. Method according to claim 16, further comprising a step of cleaning wherein a rinsing fluid is introduced and removed from the infusion chamber.

20. Method according to claim 16, further comprising a step of removing the capsule from said support after removing said infused liquid from the infusion chamber.

\* \* \* \* \*